(No Model.)　　　　　　　　　　　　　　　　2 Sheets—Sheet 1.
W. H. BABCOCK.
CORN PLANTER.

No. 361,254.　　　　　　　　　Patented Apr. 19, 1887.

WITNESSES:　　　　　　　　　INVENTOR:
Robert Kirk.　　　　　　　　William H Babcock
Dugald McKillop.　　　　　　By J. S. Jobe
　　　　　　　　　　　　　　　　Attorney.

N. PETERS, Photo-Lithographer, Washington, D. C.

(No Model.) 2 Sheets—Sheet 2.

W. H. BABCOCK.
CORN PLANTER.

No. 361,254. Patented Apr. 19, 1887.

WITNESSES:
Robert Kirk
Dugald McKillop

INVENTOR:
William H. Babcock
By J. S. Barb
Attorney.

UNITED STATES PATENT OFFICE.

WILLIAM H. BABCOCK, OF APLINGTON, IOWA.

CORN-PLANTER.

SPECIFICATION forming part of Letters Patent No. 361,254, dated April 19, 1887.

Application filed August 7, 1886. Serial No. 210,341. (No model.)

*To all whom it may concern:*

Be it known that I, WILLIAM H. BABCOCK, of Aplington, in the county of Butler and State of Iowa, have invented a new and useful Improvement in Corn-Planters, which improvement is fully set forth in the following specification and accompanying drawings, in which—

Figure 1:
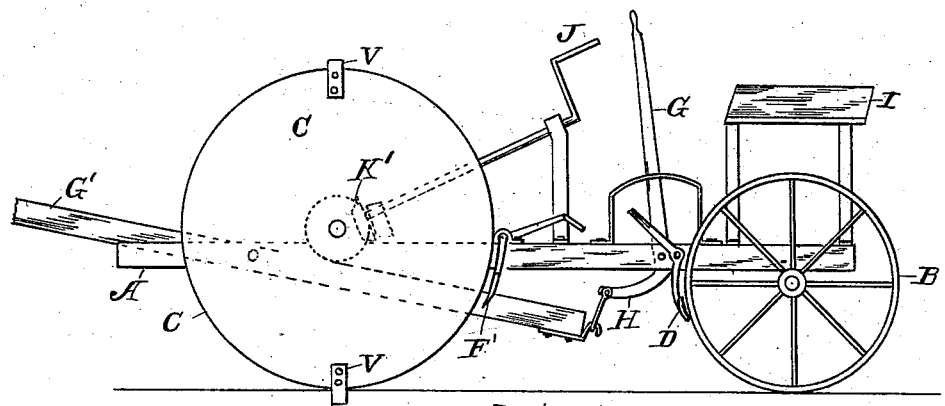
Figure 2:
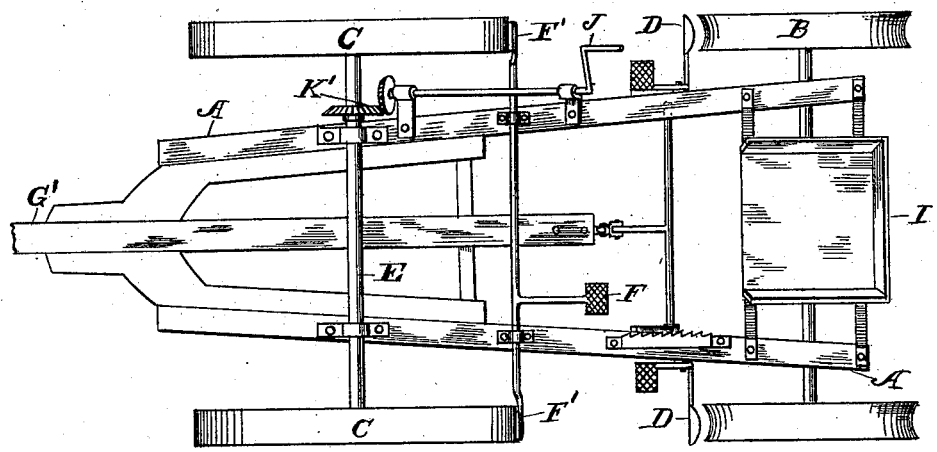
Figure 3:
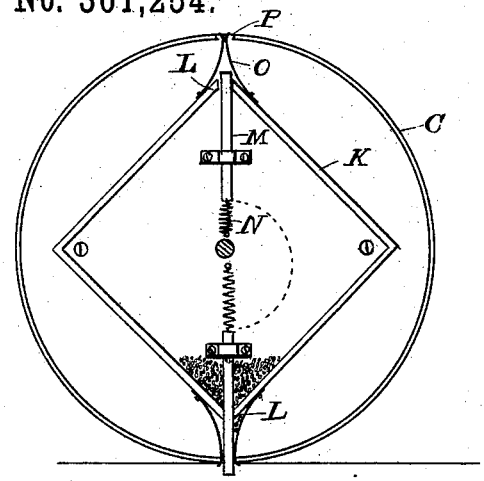
Figure 4:
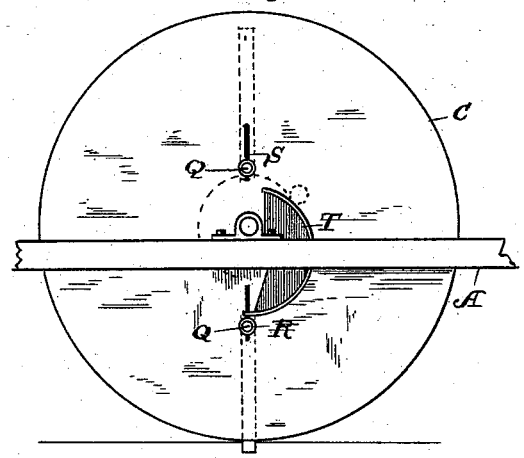
Figure 5:
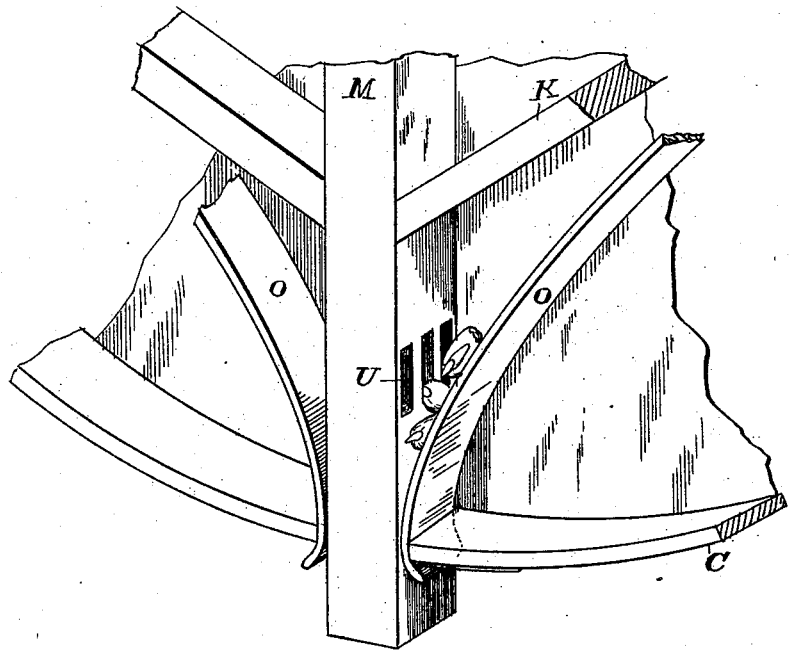

Figure 1 is a side view of my improved rotary corn-planter; Fig. 2, a plan view of the same; Fig. 3, a sectional view of the rotary dropper attachment; Fig. 4, an external view of the rotary dropper, showing connection with the cam on the frame; Fig. 5, an enlarged view of the inner side of the rotary dropper.

My invention relates to an automatic rotary corn-planter, wherein I dispense with the usual shovels or shoes, and in their place substitute wheels operating hoppers and having plunger-rods on the opposite sides, so that the seed may be fed therefrom at regular intervals and forced down into the ground, all of which will now be fully set forth in detail.

In the accompanying drawings, A represents an ordinary frame, having rearward wheels, B, and forward hopper or planter wheels, C. These rearwardly-disposed wheels B have the usual concaved periphery, so as to form covering-wheels, and are each provided forwardly with a foot-lever cleaner, D. Forwardly I provide a transverse shaft, E, having at the outer end the wheel C, as already shown, also provided with cleaners F', operated by the foot-lever F. The pole G' is pivoted to the frame A forwardly from the cross transverse shaft D, the said pole extending rearwardly some distance past the rear edge of the wheels C; and in order that the wheels C may be adjusted at any position to correspond with the rows of corn already planted, I provide a lever, G, rearwardly with a forwardly-projecting arm, H, attached to the rear end of the tongue G', so that the operator, sitting upon the seat I and pulling rearwardly upon the lever G, will raise the forward part of the device and the wheels C slightly from the ground, and by means of the crank J, connected at its forward end by means of bevel-gearing K' with the shaft F, carrying the wheels C, the said wheels may be partially rotated, so as to correspond with the hills already planted.

The forward wheels, C, are provided inwardly with a rectangular part, K, so disposed as to form a reservoir for the reception of the seed. Through opposite angles L of the reservoir I provide plungers M, so disposed that the outer ends may pass through the opening out and beyond the periphery several inches. The inner ends of these plungers M have spiral springs N, so that the normal position of the plungers will be with the ends resting within the openings at the angles of the reservoir K. Outwardly from the angles L of the reservoir I provide oppositely-disposed springs O, the inner end secured to the said reservoir K, while the outer end rests within the opening P of this periphery, thus permitting the outer ends of the plungers M to pass out between the said springs O. The inner end of each of the plungers M is provided with a lug, Q, having a friction-roller, R, thereon, the said lug Q passing out through the slot S in the side of the wheel. Outwardly on the frame I provide a stationary cam, T, so that when the said wheel is rotated the friction-roller R on the lug Q will engage with the said cam and force the plungers alternately down through the bottom of the wheel whenever the wheel rotates sufficiently to bring the opening P and the corresponding end of the plunger M down to the ground. Near the outer ends the plungers M are provided with openings U to receive the grain from the reservoir. The seed, after being discharged from the reservoir, is retained by the springs O pressing against the sides of the plunger M, and as soon as the wheel is rotated sufficiently to bring this lower plunger around above the upper part, then the plunger, being moved inwardly by the contraction of the spiral spring N, permits the seed to fall into the space between the springs O. This part of the wheel again coming around, the loose seed falls into the angle between the two springs, and as soon as the wheel rotates sufficiently to bring the plunger down beneath the wheel the said plunger, by the action of the cam T, will force the seed into the ground a short distance. Thus at each single revolution of the wheels two hills are dropped, the seed being carried in the reservoir between the angle of the springs O at every outward movement of the springs O, and at each succeeding and forward movement of the plunger forces the preceding amount of seed into the ground.

The circumference of the wheel C is designed to be twice the length of the space between the ordinary hills. These wheels C have two blocks, V, on their periphery, so disposed as to act as markers in the rotation of the wheels.

Having described my invention, what I claim as new is—

1. In a corn-planter, a pair of wheels placed forwardly in the machine, with the pole hinged forwardly from the said wheels, and having rearwardly a lever attachment, G H, the crank J, and bevel-gearing K', so that the said wheels may be raised and partially rotated, so as to gage the position of the rows, substantially as herein set forth.

2. The combination of the wheels C, having in their peripheries the openings O and on them the oppositely-disposed lugs V, and having inwardly the reservoir K, plunger M, having openings U, springs O, and spiral spring N, with the lugs Q, friction-roller R, and cam T, substantially as herein set forth.

3. The combination of the wheels C, reservoirs K, plungers M, springs O and N, friction-rolls R, and cam T, with the pole G', arm H, and lever G, crank J, and bevel-gearing K', substantially as herein set forth.

4. The combination of the frame A, having thereon the brackets D and F, operated as described, lever G, pole G', crank J, and bevel-gearing K', with the wheels C, having reservoir K, and peripheral openings P, and in the reservoirs the plungers M, substantially as herein set forth.

5. The combination of the lever G, pole G', crank J, bevel-wheel K', wheel C, having therein the reservoir K, springs O and N, plungers M, lugs Q, and friction-roller R, with the cam T, so disposed that the said friction-roller may engage therewith and force the plunger into the ground at each partial revolution of the wheel, the whole arranged as and for the purpose substantially as herein set forth and described.

In testimony that I claim the foregoing I have hereunto set my hand, this 4th day of May, 1886, in the presence of witnesses.

WILLIAM H. BABCOCK.

Witnesses:
L. M. SWAN,
C. J. FITZPATRICK.